US010650414B1

(12) United States Patent
Delker et al.

(10) Patent No.: US 10,650,414 B1
(45) Date of Patent: May 12, 2020

(54) COMPUTER IMPLEMENTED FRAMEWORK FOR SELECTION OF MOBILE DEVICE USERS FOR THIRD PARTY COMMUNICATION OUTREACH USING ANONYMIZED HANDLES

(71) Applicant: Sprint Communications Company L.P., Overland Park, KS (US)

(72) Inventors: Jason R. Delker, Olathe, KS (US); Wayne William Schroeder, Blue Springs, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 368 days.

(21) Appl. No.: 15/417,081

(22) Filed: Jan. 26, 2017

(51) Int. Cl.
*G06Q 30/02* (2012.01)
*G06F 16/22* (2019.01)
*G06F 16/93* (2019.01)
*G06F 16/9535* (2019.01)

(52) U.S. Cl.
CPC ......... *G06Q 30/0269* (2013.01); *G06F 16/22* (2019.01); *G06F 16/93* (2019.01); *G06F 16/9535* (2019.01); *G06Q 30/0267* (2013.01)

(58) Field of Classification Search
CPC .................................. G06Q 30/0267
See application file for complete search history.

(56) References Cited

U.S. PATENT DOCUMENTS

| | | | | |
|---|---|---|---|---|
| 2004/0064693 | A1* | 4/2004 | Pabla | H04L 63/02 713/168 |
| 2005/0216525 | A1* | 9/2005 | Wachholz-Prill | G06Q 30/02 |
| 2009/0248680 | A1* | 10/2009 | Kalavade | G06Q 30/0267 |

* cited by examiner

*Primary Examiner* — John Van Bramer
*Assistant Examiner* — Brendon Beheshti

(57) ABSTRACT

A method of generating an audience of user equipment users according to a user-searchable index for audience curation. The method includes generating the user-searchable index for audience curation, receiving user input describing a user's desired characteristic of an audience as user-friendly input through a public-facing selection interface, and parsing the user input to generate a distributed search query complying with a search syntax of a search engine. The method further includes searching the user-searchable index to determine a quantity of prospective audience members having the desired characteristic, transmitting the quantity of prospective audience members to the user to cause a terminal of the user to display the quantity of prospective audience members on a display, and transmitting the query to a first network element configured to execute the query to perform a desired action of the user when the user approves the quantity of prospective audience members.

9 Claims, 7 Drawing Sheets

COMPUTER IMPLEMENTED FRAMEWORK FOR SELECTION OF MOBILE DEVICE USERS FOR THIRD PARTY COMMUNICATION OUTREACH USING ANONYMIZED HANDLES

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Users of electronic devices typically interact with varying electronic devices in varying manners on a frequent basis. Each of these interactions may result in certain data being recorded to identify responses, preferences, locations, or other information relating to the users. To take advantage of this recorded data, it may be desirable to have an ability to create subsets of the users based on the recorded data to allow users to be targeted according to specific desired criteria. As an example, the users may be mobile phone users who are targeted using insights, or leads, obtained from the recorded data to provide notifications that are relevant to a particular user. The notifications could be advertising content or secondary content such as non-commercial content that is informative of a matter that may be of interest to the user. Examples of such informative information may include a notification of a discovery of a bright comet being targeting to users determined to have an interest in astronomy, a notification of a major sports announcement to users determined to have an interest in sports in general, the particular sport effected, or the particular team(s) effected, a notification of a public service announcement such as weather, traffic, public safety, etc. to users determined to be in, near, or have a propensity for traveling to, an effected area, or a notification of a significant find in an ancient tomb being targeted to users determined to have an interest in archaeology, among others.

SUMMARY

In an embodiment, a method of maintaining a user-searchable distributed index for an audience selection system for mobile device consumer content targeting. The method includes requesting, from a document management platform by a search agent executing on a server computer, a record of changes to consumer analytical information corresponding to consumers represented by documents in a document store, wherein the document management platform is configured to aggregate consumer analytical information corresponding to consumers that is not yet stored in the documents in the document store. The method further includes receiving, by the search agent, the record of changes to the consumer analytical information from the document management platform. The method also includes requesting, by the search agent, a document associated with a consumer and corresponding to the record of changes from the document store, writing, by the search agent, changes contained in the record of changes into the document to generate an updated document, and transmitting, by the search agent, the updated document to the document store to cause the document store to store the updated document in a non-transitory memory associated with the document store. The method further includes parsing, by a search and index server, the updated document to determine one or more index fields corresponding to the consumer analytical information for a consumer to generate a distributed index entry for the consumer, wherein the distributed index entry comprises a consumer identifier that uniquely identifies a consumer and a value of one of the one or more index fields, and wherein each of the one or more index fields corresponding to the consumer analytical information for the consumer also uniquely corresponds to one of a plurality of distributed index entries, wherein the plurality of distributed index entries are filtered into a plurality of subsets, and wherein each subset of the plurality of subsets comprises a range of possible values of the one of the one or more index fields that is less than all possible values of the one of the one or more index fields. The method further includes distributing, by the search and index server, each of the plurality of subsets to one of a plurality of storage partitions. The method further includes writing, by the search and index server, each of the plurality of subsets to a non-transitory storage medium of one of the plurality of storage partitions.

In an embodiment, for executing a computer implemented framework for identification and selection of user equipment users according to a user-searchable index for audience curation. The method includes generating, by a search an index server, the user-searchable index for audience curation, receiving, by a common interface executing as an application on a server computer, user input describing a user's desired characteristic of an audience as user-friendly input through a public-facing selection interface, and parsing, by the common interface, the user input to generate a distributed search query complying with a search syntax of a search engine, wherein generating the distributed search query comprises mapping the user-friendly input to search engine syntax compliant terms and operators. The method also includes searching, by a search engine, the user-searchable index to determine a quantity of prospective audience members having the desired characteristic, transmitting, by the common interface, the quantity of prospective audience members having the desired characteristic to the user to cause a terminal of the user to be configured to display the quantity of prospective audience members having the desired characteristic on a display of the terminal. The method further includes transmitting, by the common interface, the query to a first network element configured to execute the query to perform a desired action of the user when the user approves the quantity of prospective audience members having the desired characteristic, wherein transmitting the query to the first network element causes the first network element to store the query in a non-transitory memory of the first network element.

In an embodiment, a server comprising a processor, a non-transitory memory coupled to the processor, and an application stored in the non-transitory memory. When executed by the processor, the application receives a request to generate a customized audience in response to a user instructing a first network element to perform a desired action corresponding to the customized audience, receives user input from the user that defines parameters of the customized audience through at least one desired characteristic, wherein the user input is received from the user through a user-friendly interface, and wherein the at least one desired characteristic is selected from among consumer analytical information corresponding to prospective members of the customized audience. The application generates a query by translating the user input into a distributed index query in a distributed index search syntax, and determines a quantity of prospective members of the customized audience according to the query and based on a distributed index, wherein the distributed index comprises a plurality of distributed index entries, wherein each distributed index entry corresponds to one of the prospective members of the customized audience and comprises a consumer identifier that uniquely and anonymously identifies the one of the prospective members of the customized audience and a value of an index field associated with the one of the prospective members of the customized audience, wherein each index field corresponds to the consumer analytical information corresponding to the one of the prospective members of the customized audience, wherein the plurality of distributed index entries are filtered into a plurality of subsets, wherein each subset of the plurality of subsets comprises a range of possible values of the index field that is less than all possible values of the index field. The application further transmits a numerical value of the quantity of prospective members of the customized audience to the user to cause a terminal of the user to be configured to display the numerical value of the quantity of prospective members of the customized audience, wherein the numerical value prevents the user from directly accessing personal data corresponding to the prospective members of the customized audience to preserve a privacy of the personal data corresponding to the prospective members of the customized audience, and transmits the query to the first network element after receiving user input indicating an approval of the quantity of prospective members of the customized audience, wherein transmitting the query to the first network element causes the first network element to store the query in a non-transitory memory corresponding to the first network element.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
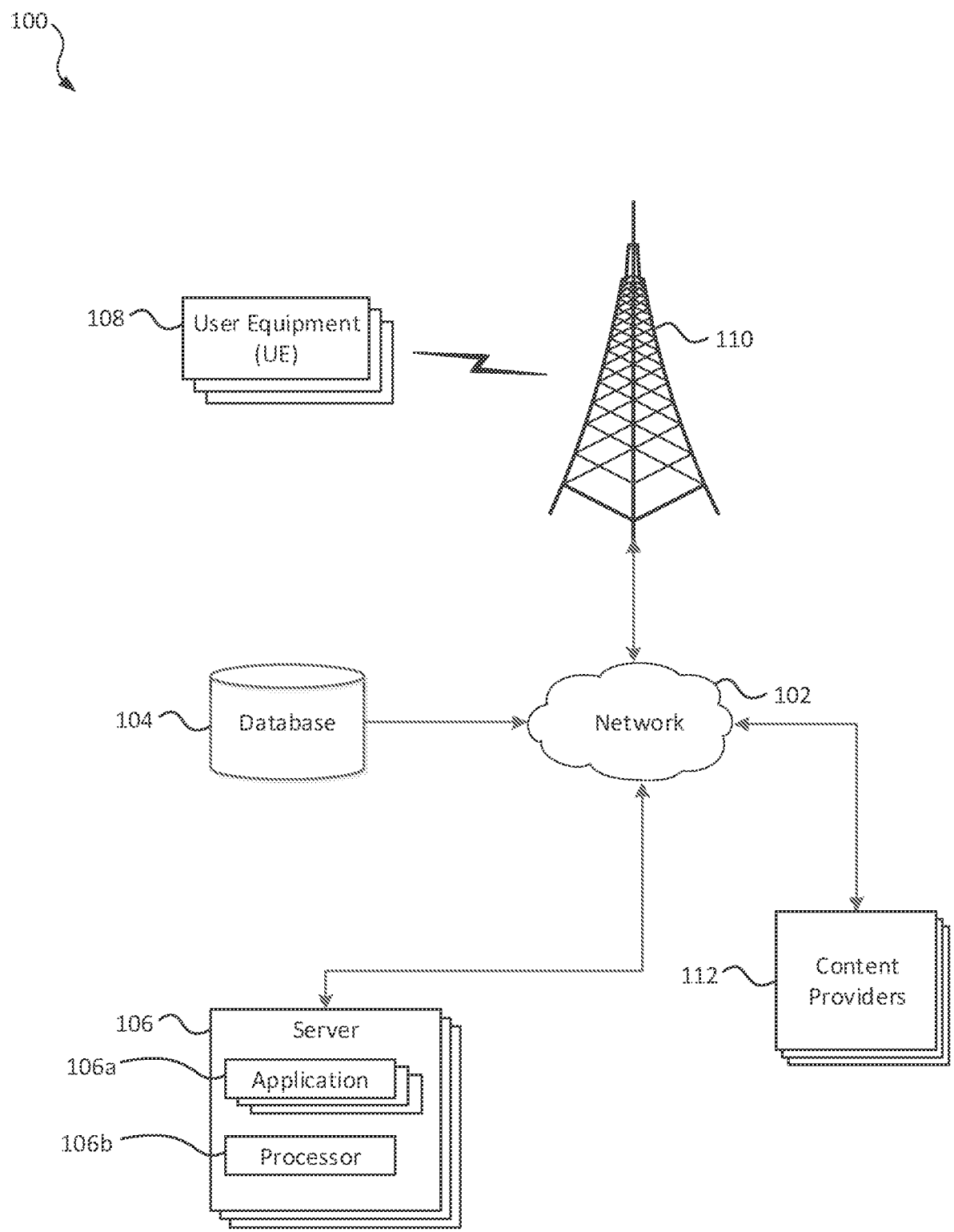
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches a computer implemented framework for selection of mobile device users for third party communication outreach (e.g., by a content provider) using anonymized handles or identities. Telecommunications service providers and other entities may expend significant time, effort, and money in collecting, categorizing, analyzing, and maintaining various records and data pertaining to consumers of the telecommunications service provider's products and services, or products and services of entities choosing to contribute to the telecommunications service provider's data compilation in return for having some degree of access to the data compilation. The records may be usage records pertaining to services utilized, locations frequented by the consumer and corresponding times of day, behavioral patterns, demographic information, geographic information, career information, various preferences of the consumer, social media activity, interests and/or dislikes, group affiliations, as well as a multitude of other pieces of analytical information that may be utilized by a telecommunications service provider or its partners to determine and/or provide information and/or services that may be desirable to the consumers. The information may be, for example, a record of cell sites that a mobile phone of the consumer has attached itself to that enables a third party to provide information and/or services to the consumer based on the location of the consumer as indicated by the record of cell sites.

Obtaining information from such large and complex data compilations may involve specialized searches that may be performed, at least in part, manually by the telecommunications service provider on a search-by-search basis resulting in relatively low efficiency, low speed, and high cost. In addition, proper formation of effective search queries may be a complex and time consuming process based on specialized knowledge and experience, or that invokes knowledge of query formation and syntax rules that may not be user friendly (e.g., such that an untrained individual may not be capable of properly forming an effective search query). Accordingly, a system that enables a content provider who wishes to target an audience of consumers whose information is stored in the data compilation, according to pieces of that stored information, to directly determine and select the audience of consumers in a user-friendly and secure manner may be desirable. However, providing information from the data compilations based on the specialized searches that are performed manually may also expose the consumer's data contained in the data compilations to the individual performing the manual search, thereby decreasing a level of privacy of the consumer's data. To maintain a high level of privacy of the consumer's data, the consumer data may be indexed and each consumer associated with a unique and anonymous identifier. In this way, a content provider may be enabled, through a telecommunications service provider's infrastructure network, receive options for defining and refining an audience, as well as a resulting size of the audience according to the content provider's definitions, while actual identities of the audience members themselves, as well as the consumer data of the audience members, remains private within the network of the telecommunications service provider to ensure privacy of the consumer's data and audience members' actual identities.

Disclosed herein are various embodiments that enable a content provider to securely access a telecommunications service provider's consumer records and data via a computer implemented framework for selection of mobile device users for third party communication outreach using anonymized handles or identities. The computer implemented framework exists at least partially within a network of the telecommunications service provider and is configured to enable access by a content provider to data stored within the telecommunication's service provider's network to provide useful benefits to the content provider and the consumers whose data is stored in the telecommunications service provider's network while maintaining the privacy of the consumers whose data is stored in the telecommunications service provider's network.

The consumer records and data stored within the telecommunications service provider's network may be updated frequently (e.g., each time a consumer interacts with a device that is in communication with the telecommunications service provider's network and/or a content provider, each time a device of the consumer changes associations between access points within the telecommunications service provider's network, etc.). In this manner, the consumer records and data may reflect both historical and substantially recent (e.g., current or present data accurate to 1 minute, 5 minutes, 10 minutes, 30 minutes, 1 hour, etc.) movements of the consumer and/or interactions of the consumer with the telecommunications service provider's network. Such a frequency of updates may correspondingly result in a strain on network infrastructure equipment located within the telecommunications service provider's network, as well as contribute to a large volume of consumer records and data stored by the telecommunications service provider, thereby causing inefficient and/or delayed processing of content provider's requests for consumer data.

To account for the frequent updates of the consumer records and data, and to protect consumer privacy, the telecommunications service provider may not provide the content providers with direct access to the consumer records and data itself, but instead may provide an index of the consumer records and data that is searchable by the content provider via a user interface. To efficiently handle requests from content providers, as well as the frequent updates to the consumer records and data that result in re-indexing of the consumer records and data to provide up to date indexes, the telecommunications service provider may form a distributed index that is spread across a plurality of partitions and/or physical devices. The distributed index may comprise a plurality of indexes that each include reference to a portion of the consumer records and data stored by the telecommunications service provider. For example, a first index of the distributed index may include identifiers for consumers having an age within the range of 19 years old to 24 years old, a second index of the distributed index may include identifiers for consumers having an age in the range of 40 years old to 50 years old, a third index of the distributed index may include identifiers for consumers that are presently associated with a given access point.

In this manner, the consumer record and data stored by the telecommunications service provider is split into more manageable pieces that are smaller and require less computing power or time to search, thereby enabling the telecommunications service provider to efficiently and rapidly respond to a content provider's request for consumer information. In addition, because the distributed index does not contain the actual consumer records and data, but instead merely an anonymous identifier that indicates that a respective consumer falls within a category indexed within that particular index of the distributed index, consumer privacy and security of information is maintained. Such a solution of indexing consumer records and data stored by a telecommunications service provider and distributing portions of that index as a distributed index to a plurality of locations enables a content provider to efficiently utilize the consumer records and data stored by a telecommunications service provider to identify one or more particular consumers having desired characteristics, while also maintaining the consumer's privacy so that the content provider does not receive access to the consumer's actual identity, or receive access to the actual consumer records and data itself that is stored by the telecommunications service provider.

Therefore, such a solution provides value to each involved party by enabling the telecommunications service provider to engage content providers to utilize the consumer records and data stored by a telecommunications service provider to benefit consumers through a more personalized and targeted experience, allows content providers to utilize the large volume of consumer records and data stored by a telecommunications service provider and the telecommunications service provider's network infrastructure, and allows consumers to receive a more personalized and targeted experience while maintaining privacy of the consumer's data.

The disclosed embodiments further provide for maintaining a back-end document store of documents containing name/value pairs of consumer analytical information, where each document uniquely corresponds to a single consumer and the document is searchable to provide a curated audience to a content provider for performing a feature of a product offered by a telecommunications service provider to the content provider, where the feature includes interaction with a target set of consumers. A user-friendly, real-time accessible front-end enables the content provider to have limited access to the document store for the limited purpose of defining and refining a customized audience selection to be used when performing the feature of the product without engaging the intervention of an employee of the telecommunications service provider for manual searching and while maintaining security and privacy of consumer records and data stored within the document store. The user-friendly front end may be considered user-friendly by way of enabling an end user such as a content provider to input desired characteristics for a desired audience without requiring specialized knowledge such as a search query syntax. For example, the user-friendly front end may enable a content provide to designate a geographic location by clicking on a map or drawing a shape on a map to encompass a desired area, by selecting desired characteristics via one or more interface elements that indicate a plurality of pre-filled desired characteristic options, by inputting a natural language description of desired characteristics and/or a desired audience, or other suitable means that are generally accessible to individuals without specialized training or knowledge in performing database searches or formulating search queries. The user-friendly front-end receives and interprets input of the content provider to generate a search query suitable for searching the document store, or an index of the document store, to select the audience according to the input of the content provider. The user-friendly front-end limits access of the content provider to the document store such that the content provider has no direct access to the consumer analytical information, or identifiers of the consumers whether members of the selected audience or not members of the selected audience.

As used herein, the content provider may be any person or entity who wishes to use the product offered by the telecommunications service provider to provide content to a consumer having a corresponding document stored in the document store, and the content may be any one or more of textual content, graphical content, audio content, or any other form of digital media of information that is deliverable to a user of a user equipment (UE). The content may be provided to the consumer through the feature of the product of telecommunications service provider, and the feature may be, for example, any one or more of an Internet Protocol (IP) notification, a short message service (SMS) or text message, an electronic mail (email) message, or any other form of digital notification that is transmittable by the telecommunications service provider to a targeted audience of users. The consumer may be a consumer of services and/or products offered by the telecommunications service provider, a consumer of services and/or products of the content provider, a consumer of targeted interactions or notifications transmitted by the content provider using the product, a consumer of services and/or products of a partner of the telecommunications service provider who participates in a consumer analytical information collection program, a user of a mobile or other electronic device that utilizes a network of the telecommunications service provider, or any combination thereof.

To maintain the document store, the documents stored in the documents store are updated according to a record of changes requested and received from a management entity, where the record of changes correspond to one or more consumers having associated documents stored in the document store. After the documents are updated, they are re-stored to the document store. To provide a distributively searchable form of the document, after re-storing the documents to the document store, each updated document is indexed and the resulting indexes are stored in one or more network elements and/or databases. To generate the curated audience, a content provider is presented with a user-friendly interface for entry of user input. The user input indicates one or more desired characteristics for the resulting curated audience. The user input of the content provider is parsed and used to generate a search query that complies with a search syntax of a search engine. Using the search engine, the previously stored index is searched to determine a number of consumers having the desired characteristics. The number of consumers is displayed to the content provider and the content provider may modify the desired characteristics, and thereby the resulting search query and number of consumers, until the number of consumers is satisfactory to the content provider. Once the number of consumers is satisfactory to the content provider, the search query is transmitted to a network element for storage and execution to perform an action or feature requested by the content provider.

Turning now to FIG. 1, a communications system 100 is described. In an embodiment, the communication system 100 is configured to receive and record information from a plurality of UEs 108, and to enable query-based selection of some of the plurality of UEs 108 from which information has been received. The system 100 comprises one or more enhanced Node Bs (eNBs) 110 configured to facilitate wireless communication between the plurality of UEs 108 and a network 102. To facilitate the communication between the plurality of UEs 108 and the network 102, the eNB 110 is communicatively coupled to the network 102 and wirelessly communicatively coupled to the plurality of UEs 108 according to one or more wireless communications protocols. For example, the eNB 110 and the plurality of UEs 108 may communicate according to at least one of a code division multiple access (CDMA) wireless communication protocol, a global system for mobile communication (GSM) wireless communication protocol, a long-term evolution (LTE) wireless communication protocol, a world-wide interoperability for microwave access (WiMAX) wireless communication protocol, or any other suitable wireless communication protocol that facilitates wireless communication between the plurality of UEs 108 and the eNB 110. Correspondingly, the eNB 110 may take on various forms according to particular needs of a telecommunications service provider or protocols of the network 102 to which the eNB 110 is coupled. For example, in some embodiments the eNB 110 may be referred to as, or replaced by, a base station, a node B, a base transceiver station (BTS), a radio base station (RBS), or as any other device that facilitates wireless communication between the plurality of UEs 108 and the network 102. The UE 108 may be a mobile phone, a smart phone, a personal digital assistant (PDA), a wearable computer, a headset computer, a media player, a laptop computer, a notebook computer, or a tablet computer. The network 102 comprises one or more private networks, one or more public networks, or a combination thereof.

The system 100 further comprises a plurality of network components that serve as a source and/or a destination for communications with the plurality of UEs 108. For example, the system 100 comprises a database 104, which also may be referred to as a data store, configured to store information desired by the telecommunications service providers, for example, such as information associated with the plurality of UEs 108 via the network 102. The information stored on the database 104 may be managed by a management platform and may be received and/or collected (e.g., by use of a crawler) through a plurality of sources such as, for example, product registration information submitted by a user, network usage information for a user that is stored by a telecommunications service provider, social media or Internet-based information resulting from user interactions, etc. The database 104 is communicatively coupled through network 102 to at least one server 106 that comprises a non-transitory medium in which an application 106a is stored and executed by a processor 106b. The server 106 may access and analyze information stored in the database 104 to, for example, determine common characteristics among users of the plurality of UEs 108, determine geographic or behavioral patterns associated with users of the plurality of UEs 108, determine a number of users of the plurality of UEs 108 that have a desired characteristic, and to make other like determinations.

The system 100 may further comprise at least one content provider 112. Alternatively, the content provider 112 may not be a component of the system 100 but may instead interact and/or communicate with the system 100. For example, the content provider 112 may access at least a portion of information stored in the database 104 by accessing the network 102 by, for example, interacting with an application 106a, such as a web interface, executing on a server 106. The content provider 112 may further access the network 102 to cause a server 106 to access and analyze information stored on the database 104 to determine a number of users of the plurality of UEs 108 that have a characteristic desired by the content provider 112. In this way, a content provider 112 may utilize an application 106a on a server 106 to determine a group of users of the plurality of UEs 108 having information stored in the database 104 and who have a characteristic desired by the content provider 112. The content provider 112 may determine the group of users of the plurality of UEs 108 who have the desired characteristic to, for example, provide a targeted notification or communication to the group of users of the plurality of UEs 108 who have the desired characteristic.

In one embodiment, the information stored in database 104 is analyzed by the server 106 to form one or more clusters based upon characteristics shared between users. For example, the server 106 may analyze the information to determine shared geographic characteristics such as a location in which some of the users of the plurality of UEs 108 go for lunch on a particular day, some of the users of the plurality of UEs 108 who frequent a particular region of town at particular times of day such as a theater district, popular club area, family based entertainment area, or other characteristics which may be shared between multiple users of the plurality of UEs 108.

The clusters formed may be determined by the application 106a and those clusters may be employed by the content providers 112, as well as telecommunications service providers, to provide improved service, maintenance and/or maintenance scheduling, service options, and third party services/offers such as recommendations, advertisements, warnings or informational notices, and other like communications. In some embodiments, characteristics for use in determining the clusters may be determined by the telecommunications service providers, by a manager of the database 104, or as a result of requests received from the content providers 112. The clusters may allow the content providers 112 to identify users of the plurality of UEs 108 having a shared characteristic desired by the content providers 112 and to whom the content providers 112 wish to provide targeted notification or communication, for example, in the form of push content.

It is understood that the system 100 may comprise any number of UEs 108, eNBs 110, databases 104, servers 106, and content providers 112 such that the system 100 may be scalable to meet demand. The collectivity of eNBs 110 may be said to comprise a radio access network, in that these eNBs 110 provide a radio communication link for the UEs 108 to access the network 102. The radio access network may be abstracted in different ways and may comprise, in addition to the eNBs 110, servers and data stores such as home location registers (HLRs) or servers that implement the functionality of home location registers, visitor location registers (VLRs) or servers that implement the functionality of visitor location registers, base station controllers (BSCs), mobile switching centers (MSCs), and other network nodes that are specifically associated with providing wireless access and connectivity to the UEs 108. It is also understood that the eNB 110 may comprise any number of devices that facilitate wireless communication between UE 108 and network 102, and that the network 102 may be any combination of private and/or public networks.

Figure 2:
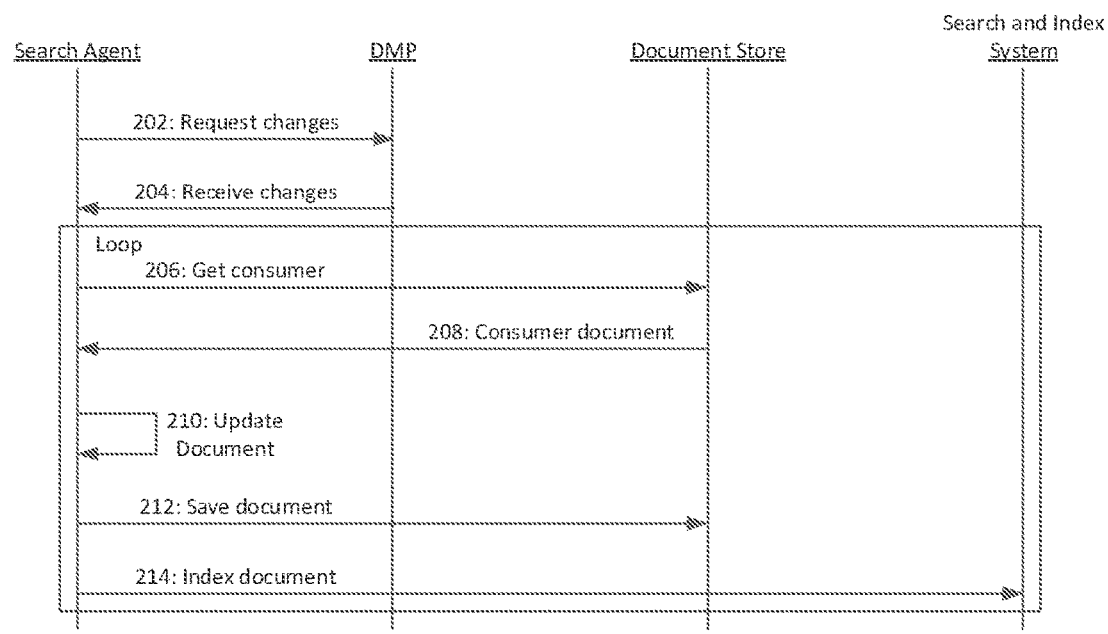
FIG. 2 is a message sequence diagram of a consumer information updating system according to an embodiment of the disclosure.

Turning now to FIG. 2, a message sequence diagram of a consumer information updating system 200 is described. In an embodiment, the system 200 is configured to maintain documents containing consumer analytical information to make the documents searchable for consumer curation, for example, in the system 100. As used herein, a consumer may be said to be a user of one of the plurality of UEs 108 of system 100 for which at least some corresponding analytical information has been stored in the database 104. To maintain the documents, the system 200 comprises a search agent, a data management platform (DMP), a document store, and a search engine. The search agent may be configured as a data as a service (DAAS) agent that consults collections of data to determine updates to the consumer analytical information, maintains the documents with the most up-to-date consumer analytical information available, and indexes the documents. The DMP may be configured to collect and combine consumer demographic, behavioral, and location information from multiple parties such as multiple wireless carriers, content providers, and consumers. Generally, the DMP collects information corresponding to a consumer for which consumer analytical information is maintained from all possible sources, thereby creating a more robust document describing the consumer analytical information for each consumer. In some embodiments, the DMP is further configured to aggregate consumer analytical information corresponding to consumers that is not yet stored in the documents in the document store. The document store may be configured to store the documents containing the consumer analytical information and may be implemented as at least a portion of at least one database 104. The document store may be selected to have a fast document retrieval time, for example, the document store may be a Hadoop Distributed File System (HDFS). The search engine may be configured to facilitate distributed index storage and searching. The Search Agent, DMP, and Search Engine may be implemented, for example, each as an application 106a, on a single server such as a server 106 in the system 100 or, alternatively, may be implemented on a plurality of servers 106. Additionally, the search engine may be a system selected for rapid searching of large indexes with various search capabilities. For example, the search engine may be a distributed implementation of SolrCloud that employs Lucene based search queries and functionality. Accordingly, in one embodiment, the system 200 may be implemented in a distributed manner in which functionality for any one or more components of the system 200 is distributed across one or more servers 106 or databases 104.

At label 202, the search agent transmits a request to the DMP for all changes to consumer analytical information managed by the DMP and receives a response from the DMP at label 204 indicating any changes. The changes may be, for example, new information submitted by a consumer through a product registration process since a last document update (e.g., through a registration process of an application utilizing a software development kit (SDK) associated with the DMP such that the SDK provides data from the registration process to at least the DMP), survey responses of a consumer, social media activity of a consumer such as, for example, geolocation tags from a consumer's social media post, content from the consumer's social media post, a subject of a consumer's subscription to a social media feed, consumer location history based on eNB connections and usage, application usage of a consumer, subscription services subscribed to by a consumer, and other forms of analytical data. The response received at label 204 may indicate any number of changes for any number of consumers. For example, in various embodiments the response may indicate a single change for a first user and a plurality of changes for a second user, a plurality of changes for both the first and the second user, a plurality of changes for the first user only, or a single change for the first user only. In one embodiment, the request transmitted at label 202 is transmitted periodically, for example, for a predetermined number of transmissions over a predetermined period of time or at a particular time of day. In other embodiments, the transmission is event based, for example caused by the DMP collecting new data or any other suitable triggering event. Actions corresponding to each of the following labels 206 through 214 may be repeated by the search agent for each consumer for which consumer analytical information changes were received at label 204 by the search agent from the DMP.

At label 206, the Search Agent transmits a request to the document store to obtain a document corresponding to a consumer for which changes were received from the DMP and receives the document from the document store at label 208. The document received by the search agent from the document store has a unique correspondence to the consumer and comprises a plurality of characteristics pertaining to the consumer analytical information about the consumer that has been collected by the DMP. The document stores the characteristics of the consumer as a plurality of values, for example, stored as name-value pairs, to facilitate searching of the document by characteristic name and/or to find a consumer having a desired characteristic value. To protect consumer privacy, the documents are identified by an anonymized identification value such as an identity for advertising (IFA). A format of the IFA may be a matter of design choice that is chosen according to particular implementation specifications, but in one embodiment may comprise a 128-bit integer number such as a globally unique identifier (GUID) or universally unique identifier (UUID).

At label 210, the search agent updates the document according to the changes received from the DMP by writing new information corresponding to the changes into the received document to form an updated document. At label 212, the search agent transmits the updated document to the document store to cause the document store to store the updated document to a non-transitory storage medium associated with the document store.

To enable searching of new consumer analytical information in the updated document, the updated document is first indexed by the search agent. At label 214, the search agent indexes the updated document and transmits the indexed document to the search engine, thereby causing the search engine to store the indexed document in one or more non-transitory storage mediums associated with the Search Engine. The search agent forms the indexed document by, in one embodiment, dividing the updated document into its respective plurality of name-value pairs to form index name-value pairs for grouping by common name so as to facilitate ease of searching. In some embodiments, the index name-value pairs may be referred to as data pairs and/or distributed index entries. The search engine may, for example, store the index name-value pairs with other index name-value pairs corresponding to other consumers and which have a common type of value in the name value pair (e.g., such that name-value pairs of a plurality of consumers pertaining to a single characteristic or type of value may be collectively stored as a subset).

The search engine may store the index name-value pairs on a plurality of nodes (e.g., such as servers, databases, network elements, storage devices, storage partitions in separate physical devices, storage partitions within the same physical device, virtually separated storage locations and/or storage partitions, etc.) with each node containing only a portion or subset of the indexed document such that the indexed document is said to be distributively indexed or to exist in a distributed search engine or distributed index. For example, each subset of the plurality of subsets may comprise a range of possible values of index entries that is less than all possible values of the index entries. In such an example, for an indexed field of the updated document that indicates consumer age, a single node may only contain index entries for a given value, such as 47 years old, or may contain index entries for a given range, such as 43-47 years old, or group of values, such as 43-47 years old and 52-54 years old. In this way, a time and computational complexity requirement for searching the index to find updated documents having certain entries may be reduced and controlled through the size index entry value ranges distributed to each node in the search engine.

Figure 3:
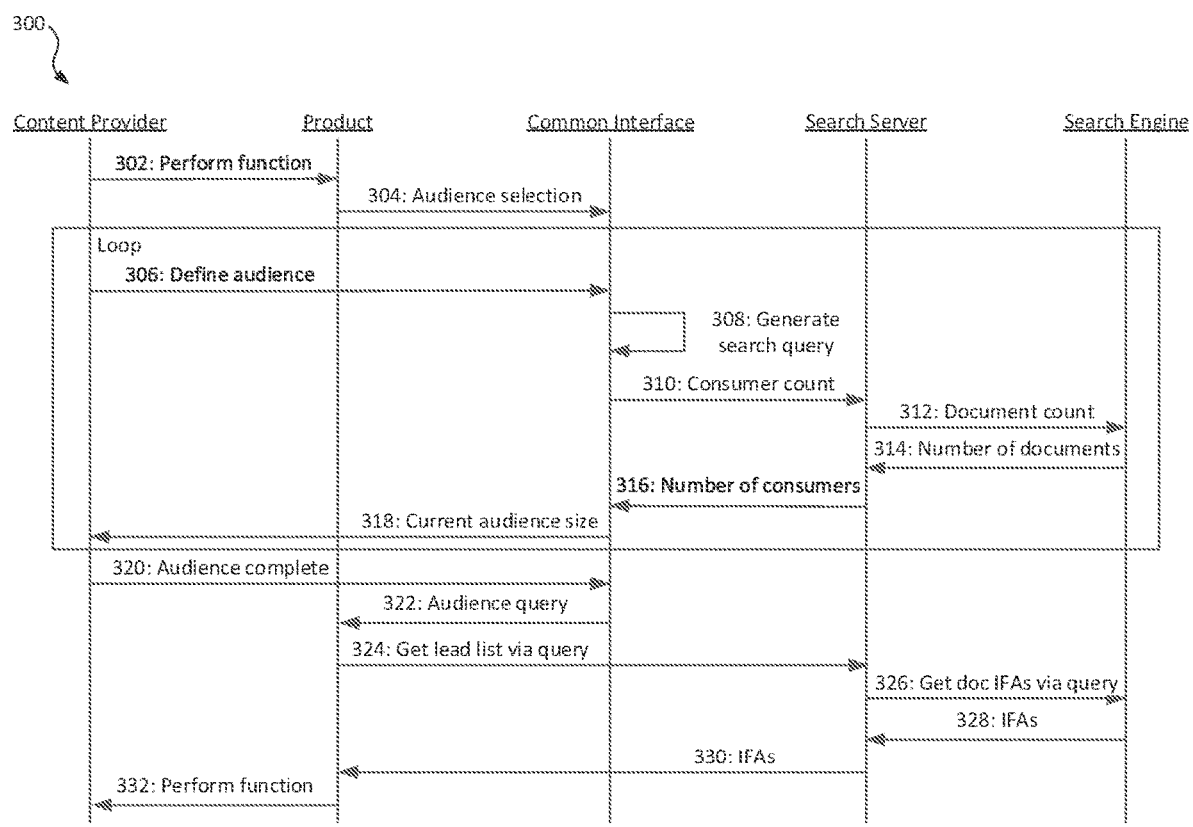
FIG. 3 is another message sequence diagram of a consumer group curation system according to an embodiment of the disclosure.

Turning now to FIG. 3, a message sequence diagram of a consumer group curation system 300 according to an embodiment of the disclosure is described. The system 300 is configured to enable a content provider to autonomously curate a group of consumers having a desired characteristic from a database containing consumer analytical information, for example, as maintained by the system 200. The system 300 is further configured to be operable in a network such as the network 100 such that the content provider 112 may curate a group of consumers (e.g., users of the plurality of UEs 108) according to consumer analytical information stored in the database 104 through a series of interactions with one or more of the servers 106 and/or the applications 106a. For example, in one embodiment, the content provider 112 may be a mobile application developer and/or publisher wishing to curate a group of users to target for advertising of services and/or products tailored to that group of users. In another embodiment, the content provider 112 may be a services provider wishing to curate a group of users to target for an informational notice of relevance to that group of users, for example, a notice about traffic and/or road conditions on a route to a destination frequented by the group of users, information about offerings available at that destination, or other relevant information. Generally, the system 300 enables a content provider 112, who may be broadly considered as any person or entity wishing to wirelessly provide information to one or more users of a plurality of UEs 108, to curate a group of the users of the plurality of UEs 108 according to one or more desired characteristics of the consumers based on consumer analytical information stored in the database 104.

At label 302, the content provider 108, who may also be referred to as a user of the system 300, accesses a product of the system 300 to perform a function. In one embodiment, the product may be a service provided to the content provider 112 by a telecommunications service provider. For example, the product may be a push-as-a-service product that offers push notification services to the content provider 112. In another example, the product may offer Internet Protocol (IP) messaging based notifications, notifications to UEs on which an application is installed that utilizes the SDK, or any other form of notification or electronic transmission to one or more users of the plurality of UEs 108 by the content provider 112 directly or indirectly through the telecommunications service provider on behalf of the content provider 112. The content provider 112 accessing the product to perform the function at label 302 indicates to the product that curation of a group or audience of users of the plurality of UEs 108 according to desired characteristics defined by the content provider 112 is needed.

At label 304, the product informs a common interface that audience selection is desired to curate the group of users of the plurality of UEs 108 according to characteristics defined by the content provider 112. In one embodiment, the product informing the common interface causes the common interface to be displayed to the content provider 112, thereby enabling the content provider 112 to interact directly with the common interface. The common interface may be operable as an application 106a on a server 106 capable of interacting with, and retrieving information from, the database 104 such that the common interface provides a user-friendly front-end for the database 104. For example, in one embodiment, the common interface may be an interface that is common to a plurality of operating systems such that the common interface ay be said to be interoperable. The common interface may comprise a set of Hypertext Markup Language (HTML) and/or JavaScript resources that produce an audience selection interface capable of display in a web-based user interface. The audience selection interface and web-based user interface may be incorporated into the product or, alternatively, may be independent of the product and activated in response to the content provider accessing the product to perform the function at label 302.

At label 306, the content provider 112 interacts with the common interface to provide user input indicating one or more desired characteristics of the audience to be selected. In one embodiment, the audience selection interface displays selection options corresponding to one or more categories of the consumer analytical information stored in the consumer documents of the database 104. The content provider 112 then uses the selection options to indicate one or more desired characteristics, from among the consumer analytical information stored in the consumer documents, of the audience to be selected. For example, the audience selection interface may display a map on which the content provider 112 may select pre-defined geographic regions and/or define a custom geographic region as a desired characteristic. The audience selection interface may further display one or more of any combination of dialog boxes, checkboxes, radio buttons, drop down lists, list boxes, sliders, toggle buttons, text boxes, date and/or time selection inputs, and/or any other graphical user interface elements capable of presenting information to the content provider 112 to enable the content provider 112 to indicate desired criteria for selecting the audience. In this way, the common interface, through the audience selection interface, may provide a user-friendly manner for the content provider 112 to indicate the desired characteristics of the audience to be selected from among the categories of consumer analytical information available for curating the audience.

At label 308, the common interface generates a search query based on the user input received from the content provider 112 at label 306. The search query may be, in one embodiment, a Lucene search query complying with Lucene query syntax as defined by the Apache Software Foundation. In other embodiments, the search query may be another form of search query that complies with a query syntax of any one or more search engines that are capable of curating an audience based on stored consumer analytical information and according to a content provider's desired characteristics of the audience. For example, in generating the search query, the common interface may parse the user input received at label 306 from the user-friendly audience selection interface to determine search criteria for forming the search query. In many embodiments, the user input may not be directly usable for curating an audience. Instead, a search query based on the user input is generated for use in curating the audience.

The search query may be used in place of the user input as a result of syntax requirements of search engines, as well as potentially advantageous properties of search queries such as proximity searching, search criteria weighting, and other such characteristics available in search queries but not in the user input. Accordingly, a particular format of a search query that complies with a query syntax or search application programming interface (API) may be time consuming and complex for a content provider 112 to generate directly and, in some embodiments, may not be capable of direct generation in a user-friendly manner. To alleviate this potential complexity, the common interface accepts user input of the content provider 112 from the user-friendly audience selection interface and generates the search query based on the user input. The search query may combine and/or separate content of the user input to form the search query in a manner that increases an effectiveness, efficiency, and/or speed of execution of the search query. For example, the user input may be parsed to generate search criteria for individual categories of the consumer analytical information, Boolean searches, wildcard searches, fuzzy searches, proximity searches, range searches, exclusionary searches, weighted or boosted searches, searches based on set theory (e.g., using AND or NOT operators), search term and/or field grouping, or any other form of search query that combines one or more search terms (e.g., single words or phrases including multiple words) with one or more search operators and satisfies a syntax requirement of a search engine being used.

To interact with the database and select the audience, the common interface may generate asynchronous JavaScript and Extensible Markup Language (XML) (AJAX) calls for requesting an audience based on the user input. The common interface may interact directly with the database or, alternatively, may interact with the database through an intermediary to protect privacy and propriety of data in the database. At label 310, the common interface may transmit the generated search query to a search server to determine a number of consumers (e.g., users of the plurality of UEs 108) having consumer analytical information stored in the database who further have the desired characteristic indicated by the content provider in the user input received at label 306. The search server may serve as the intermediary between the common interface, a publicly accessible interface, and the database, a non-publicly accessible data store, to prevent the content provider from having direct access to the database, thereby maintaining privacy and security of the consumer analytical information stored in the database.

The search server may be implemented, for example, as a server 106 configured to respond to search queries with a count of the number of consumers who have the desired characteristic and/or with elements of the consumer analytical information corresponding to the consumers having the desired characteristic (e.g., identifiers of the consumers having the desired characteristic). The search server, in one embodiment, may be configured to respond to a search query using JavaScript and XML (JAX) XML-based web services (JAX-WS) and/or JAX restful web services (JAX-RS) protocols. In some embodiments, the search server is protected by one or more authentication mechanisms such that the search server is only accessible by products and/or the common interface belonging to and/or controlled by authorized entities. The search server, in some embodiments, may be further configured as a JBoss or Wildfly application server on which an enterprise archive (EAR) is deployed to facilitate the JAX-WS and JAX-RS functionality.

At label 312, the search server may cause a search to be performed to determine the number of documents, corresponding to consumers, that have the desired characteristic by transmitting the search query to a search engine capable of searching the database of documents and/or an index of the documents stored within the database. The search engine may be, in one embodiment, the search engine of system 200. For example, in one embodiment, the search engine may be an implementation of a Lucene search engine such as SolrCloud, a distributed search engine that facilitates both complex and fast searching. The search server, in one embodiment, causes the search to be performed by, for example, executing one or more AJAX requests to a REST API of the search engine.

At label 314, the search engine transmits the number of documents having the desired characteristic to the common interface in response to receiving the search query at label 312. The search engine may determine the number of documents having the desired characteristic by searching an index, such as a distributed index, of the documents stored in the database, thereby resulting in a search of increased speed and efficiency over a non-indexed search. For example, if the search query indicates that the content provider 112 specified an age range of 19-24 and an occupation of student, the search engine may only search indexes corresponding to students, indexes corresponding to ranges of age groups that include ages 19-24, or both. In this way, the search engine does not expend computation power and time searching through documents of non-students or documents of consumers outside of the age range only to determine that those documents are not candidates for inclusion in the audience desired by the content provider 112. To further increase efficiency and speed, when a distributed search engine with distributed indexes is used, multiple indexes may be searched according to the search query in parallel.

In one embodiment, after determining a set of documents of consumers with an age in the range of 19-24 years and a set of documents of students, the search engine may perform an intersection of the two sets to determine the number of documents corresponding to students who are between the ages of 19 and 24. In another embodiment, after identifying consumers having a first of multiple desired characteristics through an index, the document of each consumer having the first of multiple desired characteristics may be accessed and searched by the search engine to determine if the consumer has one or more of the other desired characteristics. In other embodiments, other searching strategies may be employed as desired by the search engine to produce results responsive to the search query, and a particular searching strategy or methodology is not limited herein. In some embodiments, the search engine may transmit only a numerical value representing the number of documents having the desired characteristic to the search server, while in other embodiments the search engine may transmit one or more elements of the consumer analytical information included in the documents and/or indexes to the search server.

At label 316, the search server transmits the number of consumers having the desired characteristic to the common interface after receiving the number of documents having the desired characteristic from the search engine at label 314. In some embodiments, the search server may transmit only a numerical value representing the number of consumers having the desired characteristic to the common interface, while in other embodiments the search server may transmit one or more elements of the consumer analytical information corresponding to the consumers having the desired characteristic to the common interface. The search server transmitting the numerical value of the elements of the consumer analytical information may, but is not required to, correspond to the information received from the search engine at label 314. For example, although the search engine may provide contents of the documents to the search server at label 314, the search server may provide only a numerical value representing the number of consumers for which information was received from the search engine at label 314 to the common interface.

At label 318, the common interface presents a numerical value the number of consumers who have the desired characteristic to the content provider 112. For example, the common interface may present the numerical value to the content provider 112 by generating a dialog box user interface element that includes the numerical value and causing a display of a terminal device of the content provider 112 to be configured to arrange user interface elements on the display in such a manner as to display the dialog box to the content provider 112. Alternatively, in some embodiments, the common interface may present the content provider 112 with elements of the consumer analytical information corresponding to the consumers having the desired characteristic. In response to viewing the numerical value the number of consumers who have the desired characteristic, the content provider 112 may wish to refine the audience of consumers having the desired characteristic through the addition, removal, or modification of desired characteristics such that the number of consumers who have the desired characteristic is increased or decreased. In such a scenario, actions corresponding to the foregoing label 306 through 318 are repeated until the content provider 112 is satisfied with the number of consumers who have the desired characteristic. When the content provider 112 is satisfied with the number of consumers who have the desired characteristic, at label 320 the common interface receives input from the content provider 112 that indicates that the size of the selected audience is approved, and audience selection is completed.

At label 322, the common interface transmits the search query approved by the content provider 112 to the product. At label 324, the product transmits the search query to the search server to obtain the lead list that identifies the consumers who have the desired characteristic, and at label 326 the search server transmits the search query to the search engine to obtain identifiers of the consumers who have the desired characteristic. In one embodiment, the product may use the search query to obtain a list of identifiers of the consumers who have the desired characteristic, which may be referred to as a lead list. In another embodiment, the product may save the search query for use at a later time without obtaining the lead list. For example, a saved search query may be used to obtain a lead list on a subsequent day, week, month, etc. When the search query is saved and the lead list obtained at a later date, the number of consumers who have the desired characteristic may be different at the time the search query is executed at label 324 than when the search query was approved at label 320 because the search query is executed against the most recent, or live, version of the consumer analytical information. In addition, an actual content of the lead list may be different at the time the search query is executed at label 324 than when the search query was approved at label 320. For example, a consumer who has the desired characteristic at label 320 may no longer have the desired characteristic at label 324 when the search query is saved for use at a later date and a period of time passes between performing the actions of label 322 and 324. Conversely, a consumer who does not have the desired characteristic at label 320 may have the desired characteristic at label 324 when the search query is saved for use at a later date and a period of time passes between performing the actions of label 322 and 324. In still other embodiments, the product may both obtain the lead list and save the search query so that the search query may be repeatable at a later time. The search engine determines the identifiers of the consumers who have the desired characteristic through a process substantially similar to that of determining the number of consumers having the desired characteristic in label 314, and is not repeated here for the sake of brevity. After identifying the consumers having the desired characteristic, the search engine may determine an identifier of each of the consumers, for example the IFA of each of the consumers, and transmit the IFAs to the search server in response to the query of label 326, and transmit the identifiers to the search server at label 328. It may be desirable for a telecommunications service provider, or another entity maintaining and providing access to a database of consumer analytical information, to output only anonymized identifiers of consumers for which consumer analytical information is maintained, thereby protecting a market value and proprietary nature of the consumer analytical information and preventing a content provider 112 from creating a self-maintained database, or using a product available from an entity other than the telecommunications service provider, using the telecommunications service provider's consumer analytical information.

At label 330, the search server forwards the identifiers received from the search engine to the product. After obtaining the identifiers, the product may save the identifiers so that the feature requested by the content provider 112 may be performed at a later time using the currently accurate lead list, the product may perform the feature requested by the content provider 112, or the product may both perform the feature and save the identifiers to enable the content provider 112 to request a follow-up feature using the same audience of consumers having the desired characteristic as exists at that particular point in time. It may be desirable for the product to perform the feature requested by the content provider 112 without revealing the identifiers to the content provider 112, further protecting the integrity of the telecommunications service provider's database of consumer analytical information as described with respect to label 328.

In this manner, the system 300, utilizing an infrastructure established by the system 200, enables a content provider 112 to define, and refine, an audience of consumers for targeted notifications using a product of a telecommunications service provider or a partner of the telecommunications service provider who is authorized to provide products through the telecommunications service provider's network. The content provider 112 may specify one or more desired characteristics for the audience, determine a size of the audience and a corresponding cost for transmitting a notification to the audience using the product, and transmit the notification to the audience using the product in a user-friendly and efficient manner without having actual access to the proprietary consumer analytical information collected by the telecommunications service provider and available as characteristics for defining the audience. In some embodiments, only members of the audience who have opted in to notification services on their respective UE, or members who have not opted out of notification services on their respective UE, receive the notification transmitted by the product.

Figure 4:
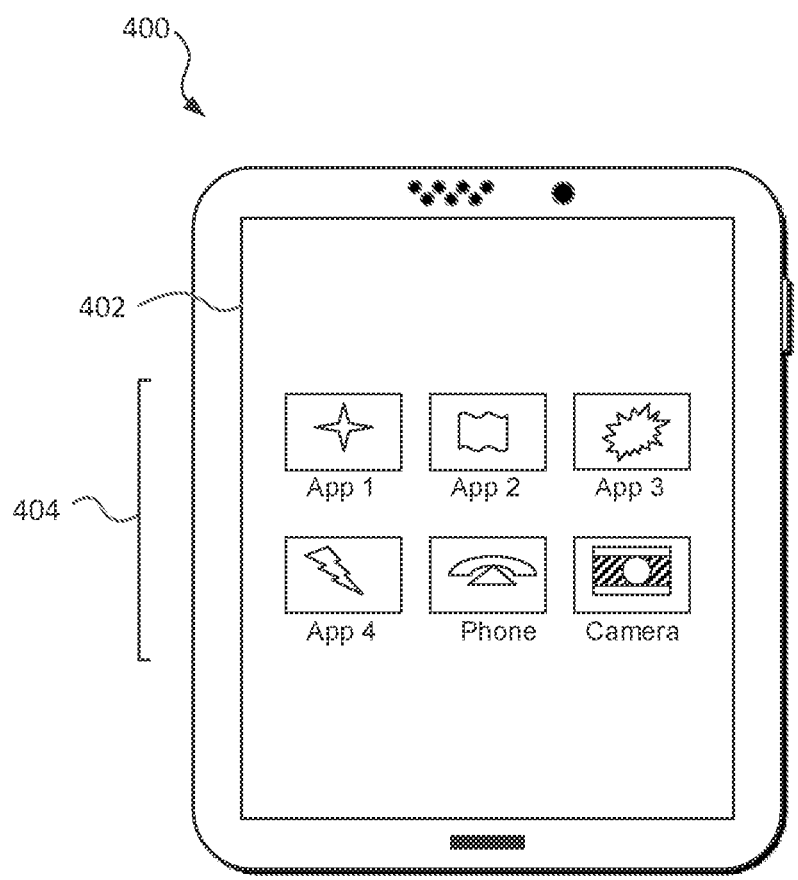
FIG. 4 is an illustration of a user equipment according to an embodiment of the disclosure.

Turning now to FIG. 4, a UE 400 is described. The UE 400 may be operable for implementing various aspects of the present disclosure; however, the present disclosure should not be limited to these implementations. For example, the UE 400 may be operable as at least one of the plurality of UEs 108. Though illustrated as a mobile phone, the UE 400 may take various forms including a wireless handset, a mobile communication device, a pager, a personal digital assistant (PDA), a gaming device, or a media player. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, an eNB, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 5:
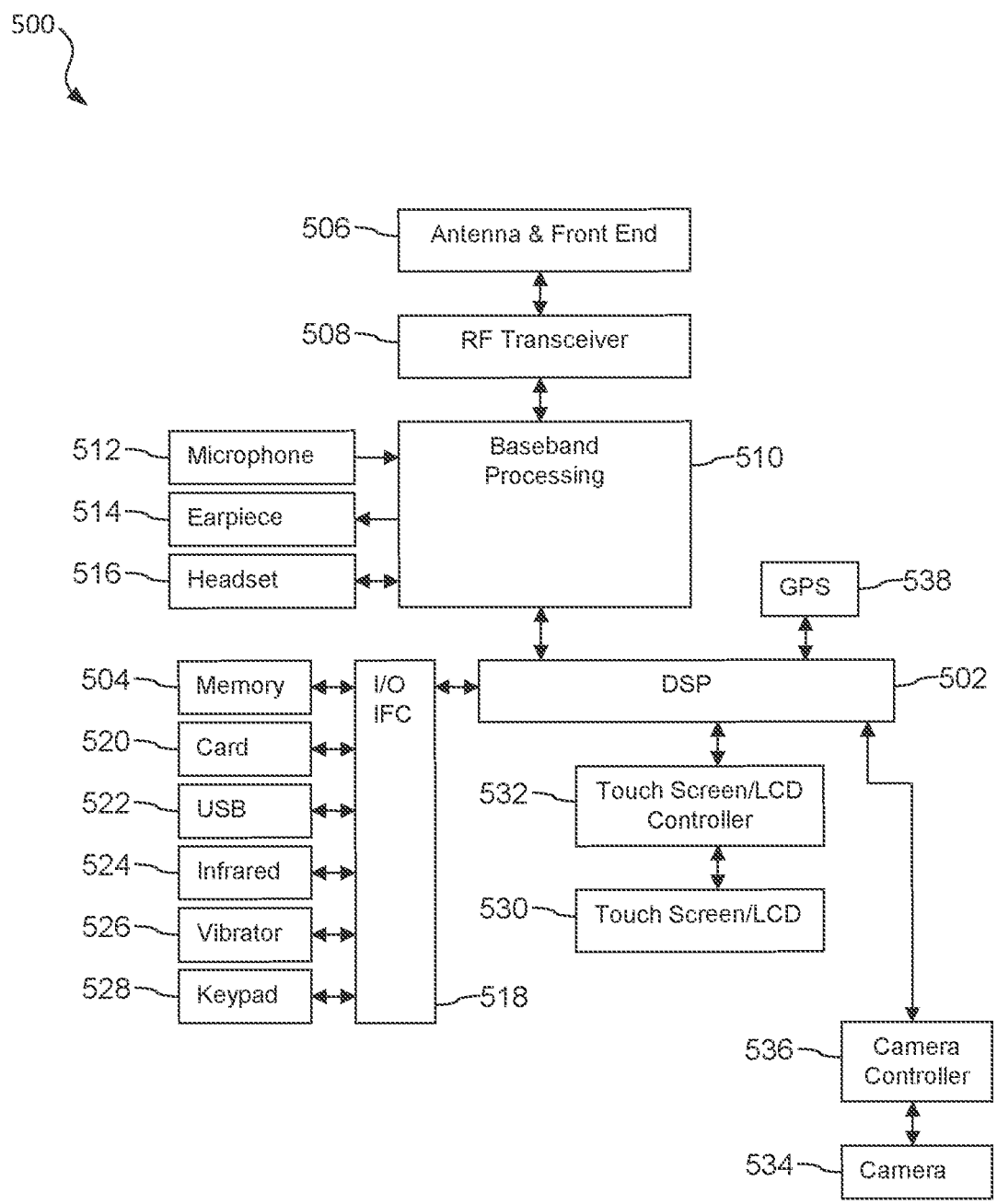
FIG. 5 is an illustration of a block diagram of the user equipment according to an embodiment of the disclosure.

Turning now to FIG. 5, a block diagram of the UE 400 is described. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets, eNBs, and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 6A:
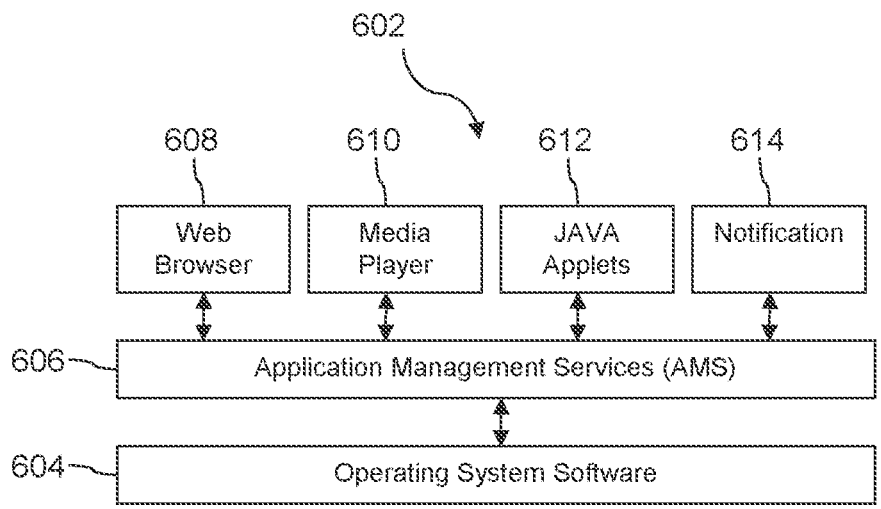
FIG. 6A is an illustration of a software environment according to an embodiment of the disclosure.

Turning now to FIG. 6A, a software environment 602 that may be implemented by the DSP 502 is described. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 6A are a web browser application 608, a media player application 610, notification application 614, and JAVA applets 612. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality. The notification application 614 may be an application that includes an SDK provided by a telecommunications service provider. The SDK may enable the notification application to transmit registration, usage, location, and other information to the telecommunications service provider for inclusion as consumer analytical information in a database. The SDK may further enable a content provider to provide targeting messaging to the UE 400 through the notification application 614. In addition to the above functionalities, the notification application 614 may have other functionalities of value to a user of the UE 400 and, in some embodiments, activities of the SDK may be performed transparently to the user of the UE 400.

Figure 6B:
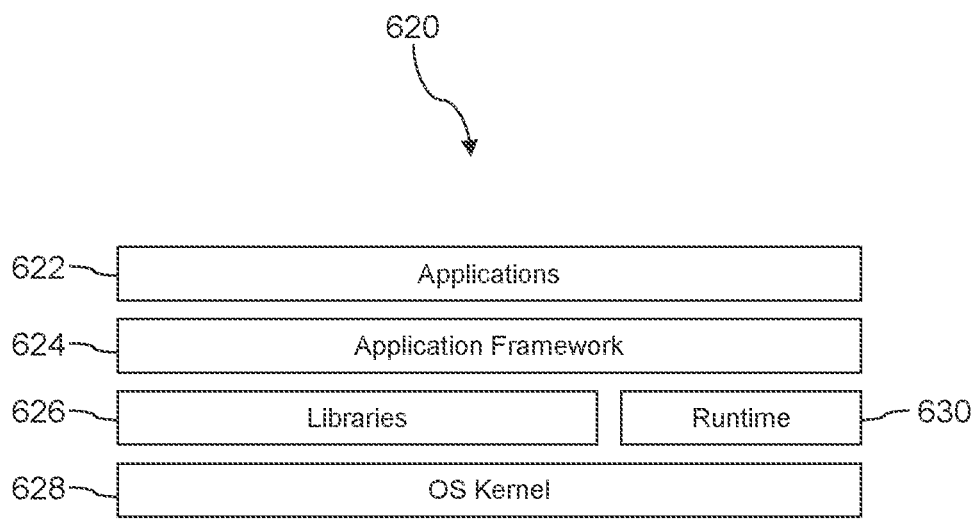
FIG. 6B is an illustration of another software environment according to an embodiment of the disclosure.

Turning now to FIG. 6B, an alternative software environment 620 that may be implemented by the DSP 502 is described. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
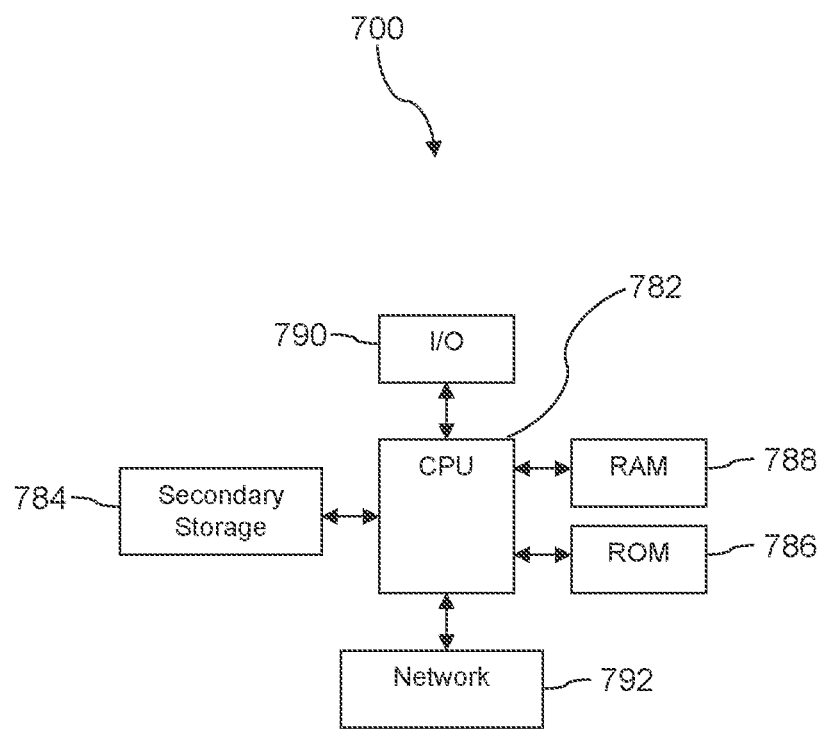
FIG. 7 is a block diagram of a computer system according to an embodiment of the disclosure.

Turning now to FIG. 7, a computer system 700 suitable for implementing one or more embodiments as disclosed herein is described. In some embodiments, the computer system 700 may be referred to as a piece of computing hardware, a piece of network equipment, a network element, a server, and/or a terminal. For example, the computer system 700 may be operable as a server 106 in the network 100, discussed above. The computer system 700 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor 782 may be implemented as one or more CPU chips.

It is understood that by programming and/or loading executable instructions onto the computer system 700, at least one of the CPU 782, the RAM 788, and the ROM 786 are changed, transforming the computer system 700 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 700 is turned on or booted, the CPU 782 may execute a computer program or application. For example, the CPU 782 may execute software or firmware stored in the ROM 786 or stored in the RAM 788. In some cases, on boot and/or when the application is initiated, the CPU 782 may copy the application or portions of the application from the secondary storage 784 to the RAM 788 or to memory space within the CPU 782 itself, and the CPU 782 may then execute instructions that the application is comprised of. In some cases, the CPU 782 may copy the application or portions of the application from memory accessed via the network connectivity devices 792 or via the I/O devices 790 to the RAM 788 or to memory space within the CPU 782, and the CPU 782 may then execute instructions that the application is comprised of. During execution, an application may load instructions into the CPU 782, for example load some of the instructions of the application into a cache of the CPU 782. In some contexts, an application that is executed may be said to configure the CPU 782 to do something, e.g., to configure the CPU 782 to perform the function or functions promoted by the subject application. When the CPU 782 is configured in this way by the application, the CPU 782 becomes a specific purpose computer or a specific purpose machine.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage 784. The RAM 788 is used to store volatile data and perhaps to store instructions. Access to both ROM 786 and RAM 788 is typically faster than to secondary storage 784. The secondary storage 784, the RAM 788, and/or the ROM 786 may be referred to in some contexts as computer readable storage media and/or non-transitory computer readable media. In some embodiments, the secondary storage may be a separate component from the computer system 700 and may be referred to as a data store, a database, a document store, or a network element, among others.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 792 may enable the processor 782 to communicate with the Internet or one or more intranets. With such a network connection, it is contemplated that the processor 782 might receive information from the network, or might output information to the network in the course of performing actions corresponding to the above-described message sequence diagram labels. Such information, which is often represented as a sequence of instructions to be executed using processor 782, may be received from and outputted to the network, for example, in the form of a computer data signal embodied in a carrier wave.

Such information, which may include data or instructions to be executed using processor 782 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embodied in the carrier wave may be referred to in some contexts as a transitory signal.

The processor 782 executes instructions, codes, computer programs, scripts which it accesses from hard disk, floppy disk, optical disk (these various disk based systems may all be considered secondary storage 784), flash drive, ROM 786, RAM 788, or the network connectivity devices 792. While only one processor 782 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 784, for example, hard drives, floppy disks, optical disks, and/or other device, the ROM 786, and/or the RAM 788 may be referred to in some contexts as non-transitory instructions and/or non-transitory information.

In an embodiment, the computer system 700 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 700 to provide the functionality of a number of servers that is not directly bound to the number of computers in the computer system 700. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 700, at least portions of the contents of the computer program product to the secondary storage 784, to the ROM 786, to the RAM 788, and/or to other non-volatile memory and volatile memory of the computer system 700. The processor 782 may process the executable instructions and/or data structures in part by directly accessing the computer program product, for example by reading from a CD-ROM disk inserted into a disk drive peripheral of the computer system 700. Alternatively, the processor 782 may process the executable instructions and/or data structures by remotely accessing the computer program product, for example by downloading the executable instructions and/or data structures from a remote server through the network connectivity devices 792. The computer program product may comprise instructions that promote the loading and/or copying of data, data structures, files, and/or executable instructions to the secondary storage 784, to the ROM 786, to the RAM 788, and/or to other non-volatile memory and volatile memory of the computer system 700.

In some contexts, the secondary storage 784, the ROM 786, and the RAM 788 may be referred to as a non-transitory computer readable medium or a computer readable storage media. A dynamic RAM embodiment of the RAM 788, likewise, may be referred to as a non-transitory computer readable medium in that while the dynamic RAM receives electrical power and is operated in accordance with its design, for example during a period of time during which the computer system 700 is turned on and operational, the dynamic RAM stores information that is written to it. Similarly, the processor 782 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for executing a computer implemented framework for identification and selection of consumers according to a user-searchable index for audience curation, comprising:

generating, by a search and index server, the user-searchable index for audience curation, wherein the user-searchable index is a distributed index comprising a plurality of distributed index entries distributed across a plurality of data stores, wherein each distributed index entry uniquely corresponds to a consumer and comprises a consumer identifier that uniquely and anonymously identifies the user and a value of an index field associated with the consumer and corresponding to consumer analytical information, wherein the plurality of distributed index entries are filtered into a plurality of subsets, each comprising a range of possible values of the index field that is less than all possible values of the index field and distributed across the plurality of data stores;

maintaining the user-searchable index by:

requesting, from a document management platform by a search agent executing on a server computer, a record of changes to consumer analytical information corresponding to consumers represented by documents in a document store including at least the document associated with the consumer, wherein the document management platform is configured to aggregate consumer analytical information corresponding to consumers that is not yet stored in the documents in the document store;

receiving, by the search agent, the record of changes to the consumer analytical information of the consumer from the document management platform;

requesting, by the search agent, a document associated with a consumer and corresponding to the record of changes from the document store;

writing, by the search agent, changes contained in the record of changes into the document associated with the consumer to generate an updated document; and distributing the document across the plurality of data stores as at least some of the plurality of distributed index entries by:

transmitting, by the search agent, the updated document to the document store to cause the document store to store the updated document in a non-transitory memory associated with the document store; and parsing, by the search and index server, the updated document to determine one or more index fields corresponding to the consumer analytical information for the consumer to generate an updated distributed index entry for the consumer, wherein the plurality of updated distributed index entries are filtered into a plurality of subsets, and wherein each subset of the plurality of subsets comprises a range of possible values of the one of the one or more index fields that is less than all possible values of the one of the one or more index fields;

distributing, by the search and index server, each of the plurality of subsets to one of the plurality of data stores; and writing, by the search and index server, each of the plurality of subsets to a non-transitory storage medium of one of the plurality of data stores;

receiving, by a common interface executing as an application on a server computer, user input describing a user's desired consumer analytical information, wherein the common interface is a public-facing user-friendly selection interface, and wherein the common interface is user-friendly in not requiring the user to provide the user input in a search syntax of a search engine;

parsing, by the common interface, the user input to generate a distributed search query complying with the search syntax of the search engine, wherein generating the distributed search query comprises mapping the input to search engine syntax compliant terms and operators;

searching, by a search engine, the user-searchable index to determine a quantity of prospective audience members having the desired consumer analytical information;

transmitting, by the common interface, the quantity of prospective audience members having the desired consumer analytical information to the user to cause a terminal of the user to be configured to display the quantity of prospective audience members having the desired consumer analytical information on a display of the terminal; and transmitting, by the common interface, the query to a first network element configured to execute the query to perform a desired action of the user when the user approves the quantity of prospective audience members having the desired consumer analytical information, wherein transmitting the query to the first network element causes the first network element to store the query in a non-transitory memory of the first network element.

2. The method of claim 1, wherein before transmitting, by the common interface, the query to the first network element, the method further comprises:

receiving user input describing a refined desired characteristic of the audience as user-friendly input through a public-facing selection interface;

re-generating the query according to the refined desired characteristic;

searching the user-searchable index to determine a quantity of prospective audience members having the refined desired characteristic; and transmitting the quantity of prospective audience members having the refined desired characteristic to the user to cause the terminal of the user to be configured to display the quantity of prospective audience members having the refined desired characteristic on the display of the terminal.

3. The method of claim 1, wherein searching, by the search engine, the user-searchable index comprises transmitting a request to an intermediary searching device, wherein the request causes the intermediary searching device to instruct the search engine to determine the quantity of prospective audience members having the desired characteristic.

4. The method of claim 3, wherein the request comprises an asynchronous Javascript and extensible markup language request.

5. The method of claim 3, wherein the intermediary searching device prevents the user from directly interacting with the search engine.

6. The method of claim 1, wherein the quantity of prospective audience members having the desired consumer analytical information comprises a determination of a number of the consumers who are represented by documents in the document store who have the desired consumer analytical information, and wherein the determination of the number of the consumers who are represented by documents in the document store is determined according to a distributed index of the documents in the document store.

7. The method of claim 6, wherein each consumer having a corresponding document comprising consumer analytical information stored in the document store is uniquely identified by an anonymized identity for advertising.

8. The method of claim 6, wherein each identity for advertising corresponds uniquely to a user equipment of the consumer that comprises a software development kit, and wherein the user equipment is addressable by the identity for advertising to cause the software development kit to display information targeted to the identity for advertising.

9. The method of claim 8, wherein the distributed index of the documents in the document store comprises a plurality of data pairs, each comprising an identity for advertising and an element of consumer analytical data corresponding to the consumer represented by the identity for advertising, wherein a first subset of the distributed index is distributed to a first of the plurality of network elements, wherein the first subset comprises a first range of possible values of an index field that is less than all possible values of the index field, and wherein a second subset of the distributed index is distributed to a second of the plurality of network elements, wherein the second subset comprises a second range of possible values of the index field that is less than all possible values of the index.

* * * * *